United States Patent [19]

Jochum

[11] Patent Number: 4,648,788

[45] Date of Patent: Mar. 10, 1987

[54] DEVICE IN FLUID PRESSURE GENERATORS

[76] Inventor: Philip Jochum, Odinslundsvägen 1 E, S-517 00 Bollebygd, Sweden

[21] Appl. No.: 777,781

[22] PCT Filed: Jan. 25, 1985

[86] PCT No.: PCT/SE85/00028
§ 371 Date: Sep. 17, 1985
§ 102(e) Date: Sep. 17, 1985

[87] PCT Pub. No.: WO85/03270
PCT Pub. Date: Aug. 1, 1985

[30] Foreign Application Priority Data

Jan. 26, 1984 [SE] Sweden ............................. 8400381

[51] Int. Cl.$^4$ .......................................... B63H 25/42
[52] U.S. Cl. ................................ 415/91; 415/122 A
[58] Field of Search .............. 114/151; 415/91, 122 A

[56] References Cited

U.S. PATENT DOCUMENTS

| | | | |
|---|---|---|---|
| 1,326,730 | 12/1919 | Helguera | 416/189 R X |
| 2,509,442 | 5/1950 | Matheisel | 415/91 |
| 2,605,606 | 8/1952 | Pilz | 415/122 A X |
| 3,198,158 | 8/1965 | Winter | 114/151 |
| 3,276,382 | 10/1966 | Richter | 415/122 A X |
| 3,918,389 | 11/1975 | Shima | 114/151 X |
| 4,242,979 | 1/1981 | Shima | 415/122 A X |

FOREIGN PATENT DOCUMENTS 2346835  4/1975  Fed. Rep. of Germany ...... 114/151

Primary Examiner—Everette A. Powell, Jr.
Attorney, Agent, or Firm—Harness, Dickey & Pierce

[57] ABSTRACT

A device in fluid pressure generators comprising an annular casing which is peripherally mounted and driven in a through-flow channel. The inner face of said annular casing forms part of the wall of the through-flow channel. The annular casing is provided with a number of propeller blades which extend radially inwardly into the through-flow channel and which are rotationally mounted on their individual pin shafts by means of which propeller blades the magnitude of the thrust may be altered in a continuous manner and the direction of operation of said thrust in the through-flow channel be reset.

6 Claims, 6 Drawing Figures

DEVICE IN FLUID PRESSURE GENERATORS

BACKGROUND OF THE INVENTION

The subject invention relates to a device in fluid pressure generators of the kind comprising an annular casing which is peripherally mounted and driven in a through-flow channel and wherein the inner face of said casing forms part of the wall of the fluid through-flow channel, said casing being equipped with a number of propeller blades which project radially inwards into the through-flow channel.

In propelling mechanisms for propulsion, steering and positioning of e.g. ships and oil rigs, the power losses are considerable. To compensate for such power losses, which have many causes, it is necessary to exaggerate the dimensions of the propeller and its prime mover with resulting the high costs.

By using a nozzle the degree of efficiency of propelling mechanisms may, as a rule, be increased. This is due to the concentration of the propelled flow by the nozzle. However, the gains are largely countered by the disadvantage caused by the necessity to provide the nozzle with shaft supports and with bearings supporting the propeller and these components together with the propeller hub result in considerable losses due to friction when the water flows through the nozzle.

Other considerable power losses are caused by the recirculating or turbulent fluid flow from the pressure faces of the propeller blades around the apices or the ends thereof towards the suction side of the blade. Because of the necessity to arrange for some clearance between the propeller blade apices and the inner wall of the nozzle this kind of power losses remains in propeller mechanisms equipped with nozzles.

Annular propelling mechanisms which are peripherally mounted and driven are known from e.g. SE-PS 342 011. These mechanisms are intended for propulsion and channel-steering systems in ships. Because the propeller, as mentioned above, is mounted at the periphery of the through-flow channel the losses therein due to friction are small. In addition, the need for clearance at the propeller blade apices is eliminated and losses connected with this arrangement therefore are almost entirely avoided. However, this prior-art publication does not provide a practical solution to the problem of how to use the mechanism for instance in channel steering systems. Since the blades are fixed in such annular propelling mechanisms the rotational direction must be reversible, which obviously means that the propeller must be stopped before it can rotate in the opposite direction. This appears from FIG. 13 of that publication and the text pertaining thereto. For this reason this prior-art propelling mechanism cannot be used with the required degree of reliability to propel e.g. passenger ferries to moor them alongside quays or in steering systems to position oil rigs and the like for drilling operations, for depositing pipelines or for driving operations in deep sea areas. Nor does SE-PS 341 011 suggest any satisfactory solutions to the problem of peripheral mounting of the annular propelling mechanism. Water-lubricated rubber bearings are suggested for the purpose. During normal operating temperatures. e.g. between appr. −4° C. and about +15° C. and for normal yearly operational periods of up to 8000 hours this kind of mounting of the annular propelling mechanism is not, however, particularly reliable.

SUMMARY OF THE INVENTION

The purpose of the subject invention is to provide a device in fluid pressure generators which are peripherally mounted and driven and which are particularly intended for propelling, steering and positioning ships and other offshore equipment, which device permits rapid resetting of the propeller blades and continuous alteration of the magnitude and the direction of the pressure in the through-flow channel. This is achieved in accordance with the invention therein that the device is arranged in such a manner that all propeller blades are arranged to be turned simultaneously by means of their individual shaft pin via a regulating mechanism which is independent of the drive of the annular casing.

BRIEF DESCRIPTION OF THE DRAWINGS

The invention will be described in closer detail in the following with reference to one embodiment thereof shown in the accompanying drawings, wherein.

DETAILED DESCRIPTION OF A PREFERRED EMBODIMENT

Figure 1:
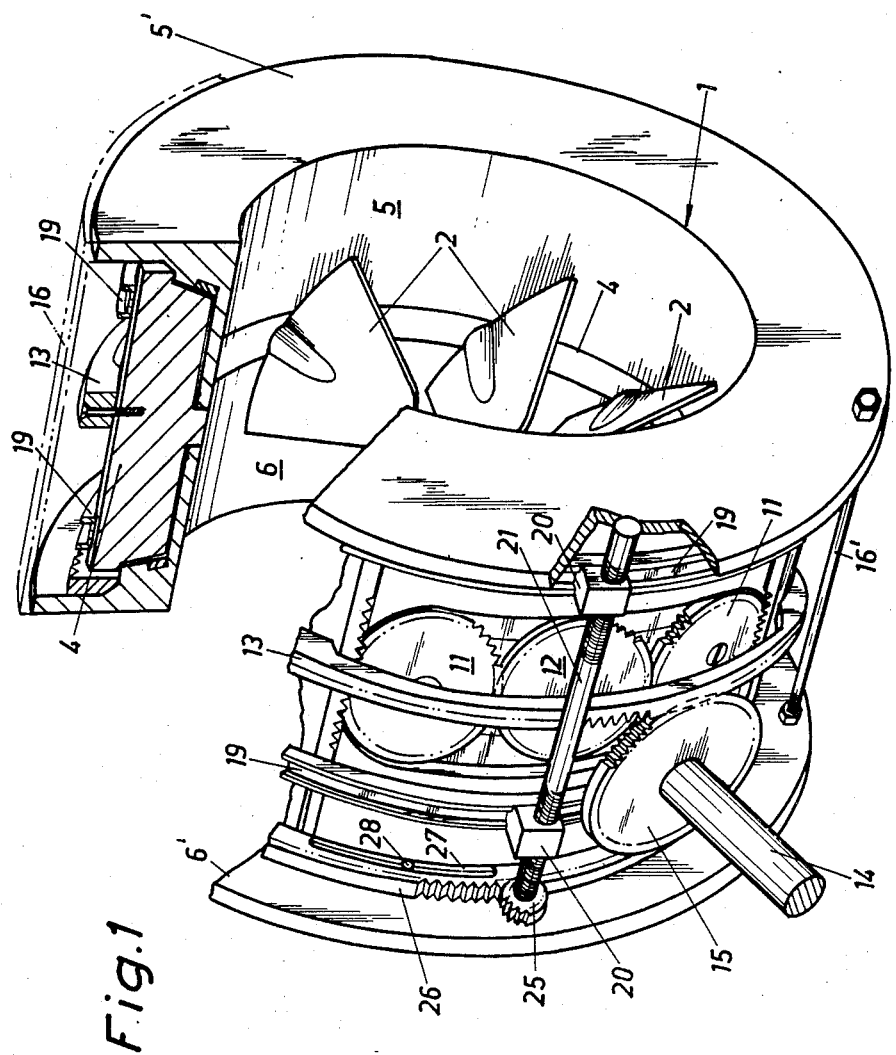
FIG. 1 is a perspective view of a fluid pressure generator in accordance with the invention in a partly broken view.
Figure 2:
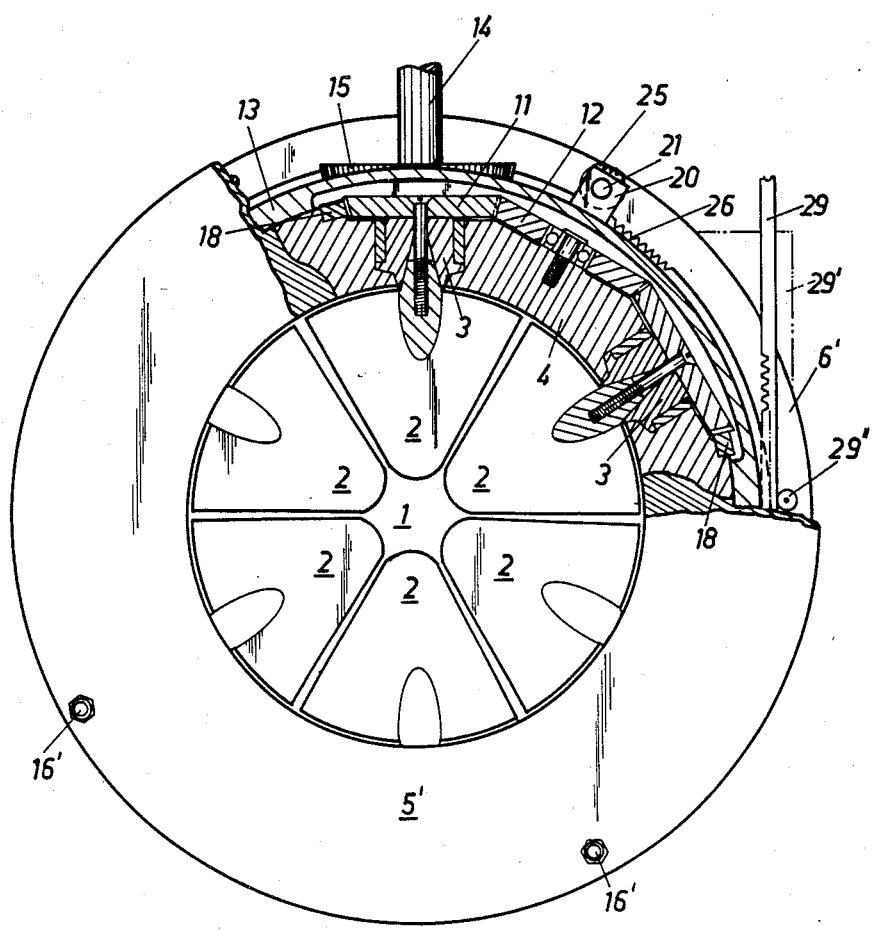
FIG. 2 is an end view of the fluid pressure generator with parts broken away.
Figure 3:
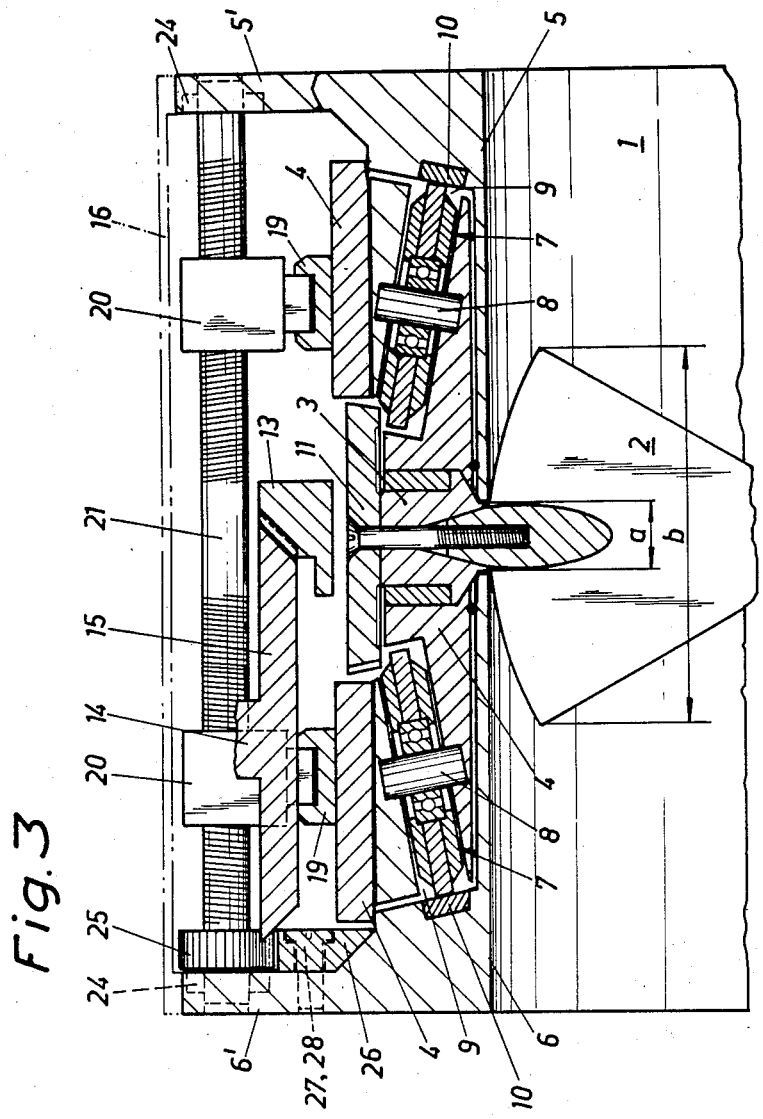
FIG. 3 illustrates on an enlarged scale an imaginary, stepped lengthwise section through the fluid pressure generator.

The pressure generator is designed to generate inside a through-flow channel 1 a flow of fluid the direction inside the channel and the force of which depend on the pitch of six propeller blades 2 which are peripherally driven inside the through-flow channel 1. The propeller blades are rotatably mounted with the aid of shaft pins 3 (see FIGS. 2 and 3) in an annular casing 4 the inner surface of which forms part of the wall of the through-flow channel 1. The annular casing 4 is rotatably mounted intermediate two casing tubes 5 and 6 which form the rest of the through-flow channel 1.

Figure 4:
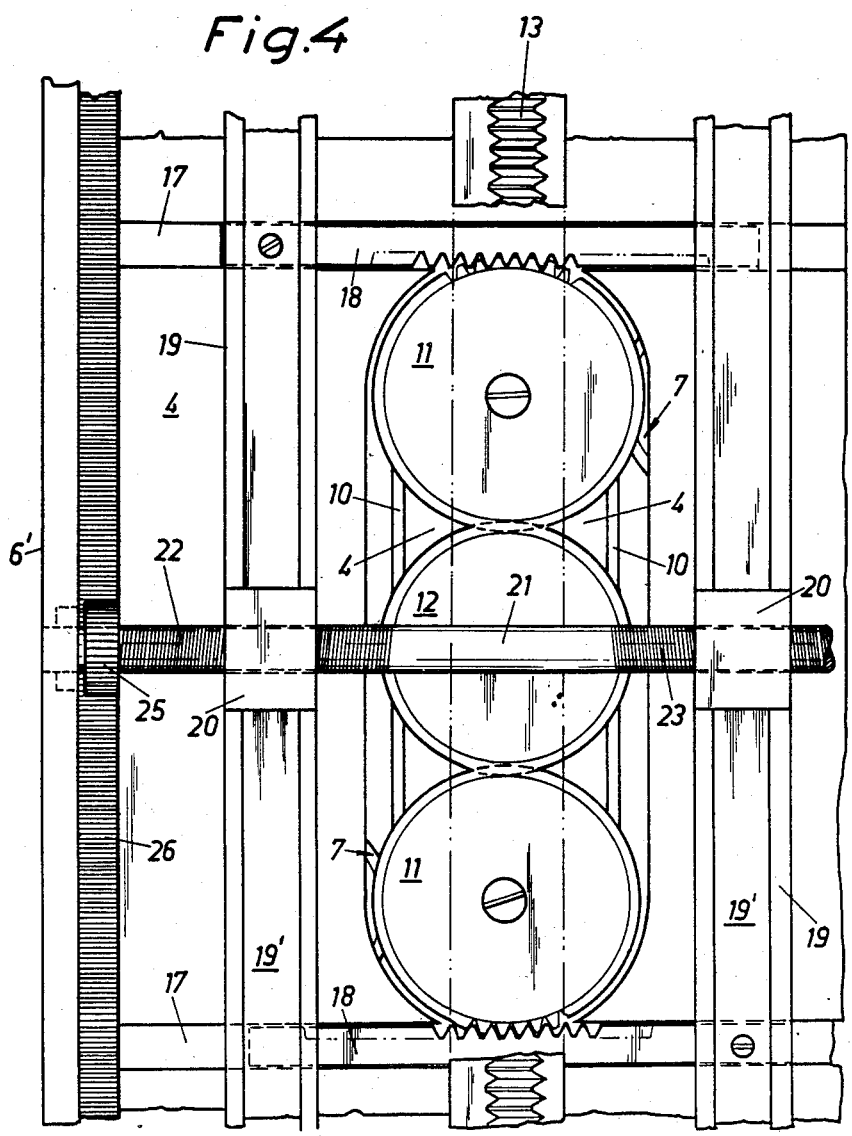
FIG. 4 is a plan view of a regulating mechanism for control of the magnitude and direction of the pressure force.

The annular casing 4 is mounted between the casing tubes 5 and 6 by means of obliquely extending rollers 7 (see FIG. 3) which by means of pins 8 are received in notches 9 in the casing 4. The rollers 7 are spaced equal pitch distance apart, six on either side of the annular casing 4 and abutting against oblique bearing races 10 in the casing tubes 5, 6. The pitch of the rollers 7 is displaced to ensure that their points of contact against the bearing race 10 in the casing tube 5 are positioned opposite their points of contact against the bearing race 10 in the casing tube 6 (see FIG. 4).

The propeller blades 2 which are mounted in the annular casing 4 by means of shaft pins 3 are non-rotationally secured to gear wheels 11 on their outer face by means of screws. The gear wheels are angularly interconnected in pairs via an idle gear wheel 12 which is rotationally mounted in the annular casing 4. The gear wheels 11, 12 are interconnected in groups of three and form three groups arranged at equal pitch and are mounted in recesses along the annular casing 4. Radially externally of said gear wheels there is arranged a gear rim 13 which is secured to the annular casing 4 intermediate the three groups of interconnected gear wheels. An angular drive means 15 associated with a drive shaft 14 meshes with the gear rim 13.

When the drive shaft 14 is rotated the annular casing 4 is turned via the angular drive means 15 and the gear rim 13 relative to the casing tubes 5, 6. The latter are formed with flange portions 5', 6', resectively, on which a cover 16 is mounted. The space internally of the cover 16 may be partly or completely filled with oil to lubricate bearings and gear wheels. Between the two flange portions 5' and 6' extend rods 16' which are adjustable by means of nuts to set the bearing clearance, that is the clearance between the rollers 7 and the bearing races 10.

Upon rotation of the annular casing 4 the propeller blades 2 generate a flow of water through the through-flow channel 1 which is dependent on the rotational speed and pitch of the propeller blades 2. The pitch may be adjusted simultaneously for all six propeller blades 2 via a regulating mechanism comprising components which rotate together with the annular casing 4 as well as components which are secured to the flange portions 5' and 6', respectively.

Consequently, on either side of each group of three gear wheels 11, 12 and across the annular casing 4 there is a groove 17 in which a gear rack 18 may run with its teeth in engagement with the gear wheel 11. The racks 18 are a great deal shorter than the grooves 17 which extend substantially all the way across the outer face of the annular casing 4 and consequently the racks may be displaced over a considerble distance in mutually opposite directions while simultaneously resetting the position of the propeller blades 2.

Runner rings 19, one on either side of the gear rim 13 are mounted coaxially about the annular casing 4. One of the rings 19 is connected with the three gear racks 18 which are positioned to one side of the three groups of gear wheels 11, 12, seen in the direction of rotation while the other runner ring 19 is connected with the remaining three gear racks 18 which are positioned on the opposite side of the groups of gear wheels. By simultaneously displacing these runner rings 19 towards or away from each other the propeller blades 2 will be reset correspondingly. Each runner ring 19 is provided with a radial groove 19' in which engage follower means 20 comprising pins. These follower means 20 are mounted for displacement on screw spindles 21 in such a manner that the follower means 20 which are connected to one of the runner rings 19 by means of a groove and pin coupling is connected to the screw spindles 21 by means of a left-hand thread 22 whereas the follower means 20 which are connected by means of a groove and pin coupling to the other runner ring 19 are connected with the screw spindles 21 via a right-hand thread 23. By rotating the motion screw spindles 21 simultaneously in one direction the runner rings 19 thus may be displaced towards or away from each other and be displaced in the opposite direction by turning the screw spindles in the opposite direction. The screw spindles 21 are journalled by means of bearings 24 in the flange portions 5', 6' in such a manner that some clearance is provided allowing adjustment of the bearing play between the bearing races 10 of the two casing tubes 5 and 6 and the rollers 7 via the rods 16'.

The number of screw spindles 21 may be two or more and they are spaced equal distances apart at equal pitch relative to the runner rings 19. Via cog wheels 25 the screw spindles 21 are connected to a second gear rim 26 which extends circularly along one flange portion 6' and which is secured to the latter by means of a groove and pin coupling 27 and 28, respectively, allowing displacement of the gear rim 26 relative to the flange portion 6' over a predetermined number of degrees which through suitable gearing of the screw spindles 21 provides sufficient movement for resetting the position of the propeller blades 2. The setting of the gear rim 26 is effected via a gear rack 29 which is connected to a positioning means, not shown, and which is arranged to move tangentially between guides 29' in the cover 16 and the flange portion 6'.

When the gear rack 29 is operated, the gear rim 26 is turned relative to the flange portion 6'. The gear rim 26 then rotates the screw spindles 21, which results in a corresponding displacement of the follower means 20 and the runner rings 19. The gear racks 18 attached thereto then turn the gear wheels 11, 12 and the pitch of the propeller blades 2 is changed. Because several screw spindles 21 affect the runner rings 19 simultaneously at equidistant points and because the associated gear wheel group 11, 12 is simultaneously affected in two opposite directions, the risks that the mechanism will jam are minimized and simultaneous action on all propeller blades 2 by restting force of equal magnitude is ensured.

The regulating mechanism described in the aforegoing makes it possible to reset the propeller blades 2 rapidly and exactly independently of the rotation of the annular casing 4, which.makes the pressure generator extremely suitable for use in steering tunnels in ships. By adjusting the setting of the propeller blades 2 the magnitude and direction of the pressure force may be varied freely inside the through-flow channel 1 while maintaining an even rotational speed which is advantageous for the driving motor (not shown).

Figure 5:
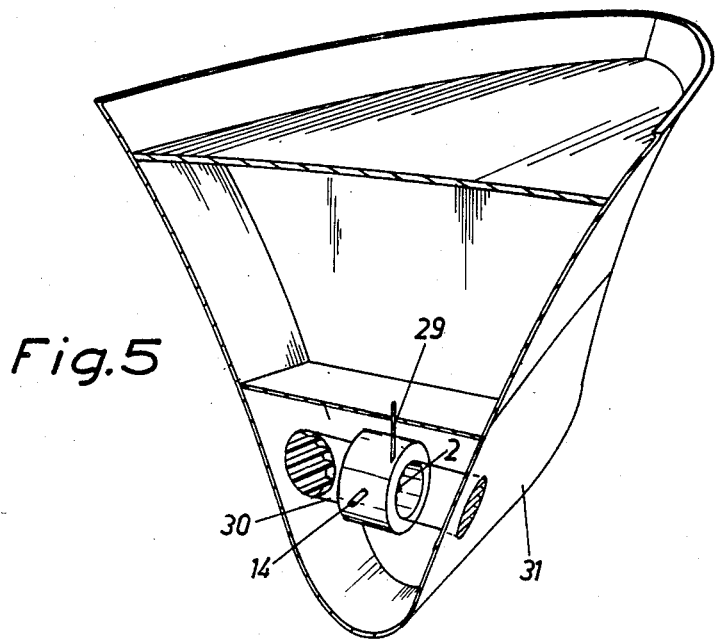
FIG. 5 is a transverse sectional view which schematically illustrates the force of a ship equipped with a fluid pressure generator in accordance with the invention.

FIG. 5 illustrates the fluid pressure generator in accordance with the invention when mounted in a steering tunnel 30 extending transversely across the prow of a ship 31.

Conventional propeller systems for this purpose usually include a propeller which is journalled in the centre of the steering tunnel and which is driven by a crank shaft, the propeller usually being of the type having adjustable propeller blades. However, a considerable proportion of the through-flow area of the steering tunnel is occupied by the crank shaft and the propeller bearings with resulting losses of power. Without considerable costs it is not either possible to produce a symmetric steering tunnel ensuring that the conditions of flow are equal in both directions, which means that the pressure force is somewhat inferior in one direction.

Figure 6:
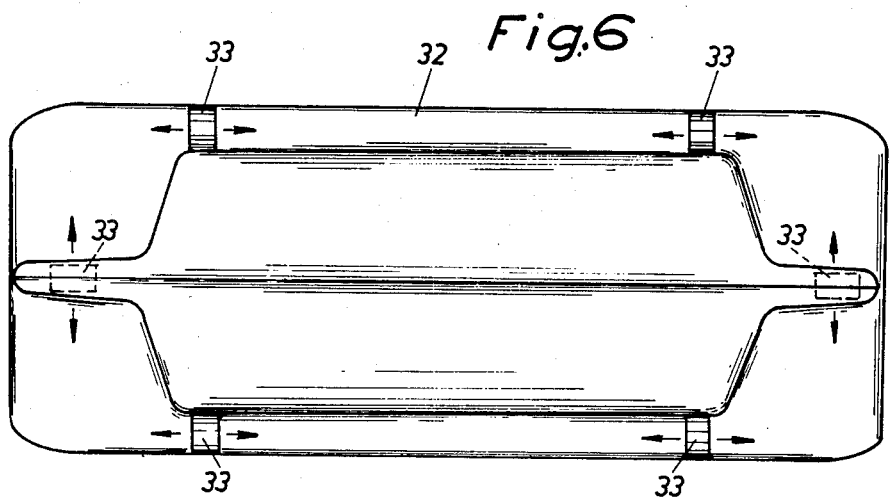
FIG. 6 illustrates schematically the below-sea-level body of a ship equipped with several fluid pressure generators in accordance with the invention.

FIG. 6 illustrates schematically a ship 32 which is equipped with six fluid pressure generators 33 in accordance with the invention for the purpose of propelling the ship and of steering it. Because of the symmetrical positions of the pressure generators 33 around the subsea-level part of the ship hull the ship may be propelled irrespective of the direction of fore and aft, which makes it suitable for use as a ferry, for instance. With the aid of the two two transversely extending pressure generators 33 it becomes possible to compensate for the currents when crossing e.g. a lake or a river without altering the course of the ship, that is, its lengthwise direction, which makes it easier to operate the ship.

Since no components except the propeller blades 2 are present in the through-flow channel 1 the losses caused by friction are small. In addition, the propeller blade surface area is at its maximum close to the wall of the through-flow channel 1 where the water pressure during ship movements is at its maximum and the clearance between this wall and the peripheral edge of the blades may be made small. This means that the pressure losses across these portions become small compared with the case in conventional propellers which are driven at their centre. Furthermore, the annular casing 4 need not be made wider in the through-flow channel 1 than the shaft pins 3. The largest width b (see FIG. 3) of the propeller blades 2 actually exceeds by several times—e.g. by 10–12 times—the width a of the portion of the annular casing 4 which constitutes a portion of the wall of the through-flow channel 1. This means that the rotating surfaces which do not generate any propelling force may be made small. Otherwise, these surfaces cause rotation of the water masses inside a through-flow channel or about a conventional propeller and this rotation does not generate a propulsion force but lowers the efficiency of the propeller.

All these various factors jointly provide for very advantageous operational conditions in the pressure generator described in the aforegoing. There is no risk of cavitation under normal operating conditions. Therefore, the pressure generator is made very efficient in relation to its dimensions.

Owing to the oblique extension of the rollers 7 and their shaft pins 8 they absorb radial as well as axial forces from the annular casing 4. Annular casings may be mounted in through-flow channels 1 of larger or smaller diameters in the same manner by using a larger or lesser number of rollers 7.

The invention is not limited to the embodiment described and shown herein or to use in the applications suggested but several modifications of the inventive object and other fields of applications are possible within the scope of the appended claims. For instance, the drive of the annular casing 4 may be effected by other means, such as through straight-tooth gear wheels, chains or belts. The regulating mechanism for resetting the positions of the propeller blades may be constructed in many various ways, e.g. via a crank or cam eccenter mechanism and with the aid of hydraulically or pneumatically operated positioning means. The pressure generator may be used as a pump, allowing regulation of flows and flow directions. The through-flow channel 1 could also be provided with guide/rails, known per se, by means of which the rotation of the water flow inside the channel 1 may be considerably reduced.

What I claim is:

1. An improved fluid pressure generator comprising an outer housing defining a through flow channel, an annular casing peripherally mounted for rotation in said outer housing, said annular casing having an inner face forming part of the wall of said through-flow channel, and a number of propeller blades provided on said annular casing, said blades projecting radially inwards into said fluid through-flow channel, and means for rotating said annular casing and said propeller blades about an axis extending through said through-flow channel the improvement comprising a shaft pin on each one of said propeller blades journaled within said annular casing, a regulating mechanism arranged to turn said propeller blades simultaneously about their individual shaft pin for changing the pitch thereof, said regulating mechanism being independent of the rotary drive of said annular casing, said annular casing having a substantially lesser length than the length of said of through-flow channel, said propeller blades tapering radially outwardly of said flow channel and defining their wider portion contiguous to said shaft pins, said shaft pins and said annular casing a substantially lesser length than the largest width of said propeller blades.

2. An improved generator as claimed in claim 1, wherein the regulating mechanism comprising a plurality of intermeshing gears disposed along a cylindrical inner face of said annular casing, said gears including gears affixed for rotation with said shaft pins, racks intermeshed with said gears for driving said gears and runner rings carrying said racks and adapted to effect reciprocation of said racks for rotating said gears and changing the pitch of said propellers.

3. An improved generator as claimed in claim 2 wherein the intermeshing gears connect adjacent groups of propellers, the racks associated with each of the sets of intermeshing gears being affixed to respective guide means for reciprocation of said racks together for rotatably coupling all of said propeller blades to each other.

4. An improved generator as claimed in claim 2, comprising a number of screw spindle and interengaging follower means, said screw spindles being connected for simultaneous rotation with setting means, said setting means being effective to rotate said screw spindles to effect displacement of said follower means, a pin and groove coupling interconnecting said follower means and said runner rings.

5. An improved generator as claimed in claim 1, comprising rollers journaled on pins, carried by said annular casing, casing tubes forming the rest of said through-flow channel, said annular casing being mounted relative said casing tubes by said rollers.

6. An improved generator as claimed in claim 5, wherein said pins servings as the shaft of rotation of said rollers are positioned in such a manner that said shafts extend at an oblique angle relative to the longitudinal axis of said through-flow channel.

* * * * *